United States Patent
Fukui et al.

(10) Patent No.: US 10,744,621 B2
(45) Date of Patent: Aug. 18, 2020

(54) CLAMP DEVICE

(71) Applicant: SMC CORPORATION, Chiyoda-ku (JP)

(72) Inventors: Chiaki Fukui, Abiko (JP); Kazuyoshi Takahashi, Koto-ku (JP); Hideki Sasaki, Toride (JP); Takeshi Seo, Nagareyama (JP); Jiro Mandokoro, Moriya (JP); Koichi Katsumata, Joso (JP)

(73) Assignee: SMC CORPORATION, Chiyoda-ku (JP)

( * ) Notice: Subject to any disclaimer, the term of this patent is extended or adjusted under 35 U.S.C. 154(b) by 75 days.

(21) Appl. No.: 15/554,939

(22) PCT Filed: Jan. 5, 2016

(86) PCT No.: PCT/JP2016/050109
§ 371 (c)(1),
(2) Date: Aug. 31, 2017

(87) PCT Pub. No.: WO2016/139962
PCT Pub. Date: Sep. 9, 2016

(65) Prior Publication Data
US 2018/0029197 A1  Feb. 1, 2018

(30) Foreign Application Priority Data

Mar. 5, 2015  (JP) .................................. 2015-043256

(51) Int. Cl.
*B25B 5/08* (2006.01)
*B25B 5/16* (2006.01)
(Continued)

(52) U.S. Cl.
CPC ............ *B25B 5/087* (2013.01); *B23Q 17/003* (2013.01); *B25B 5/02* (2013.01); *B25B 5/04* (2013.01); *B25B 5/122* (2013.01); *B25B 5/16* (2013.01)

(58) Field of Classification Search
CPC .. B25B 5/087; B25B 5/02; B25B 5/04; B25B 5/122; B25B 5/16; B23Q 17/003
(Continued)

(56) References Cited

U.S. PATENT DOCUMENTS 5,330,168 A * 7/1994 Enomoto ............... B23Q 3/069
269/329
6,364,301 B1  4/2002 Takahashi
(Continued)

FOREIGN PATENT DOCUMENTS

CN  1293098 A  5/2001
CN  102198659 A  9/2011
(Continued)

OTHER PUBLICATIONS

International Search Report dated Mar. 29, 2016, in PCT/JP2016/050109 filed Jan. 5, 2016.
(Continued)

*Primary Examiner* — Orlando E Aviles
*Assistant Examiner* — Thomas Raymond Rodgers
(74) *Attorney, Agent, or Firm* — Oblon, McClelland, Maier & Neustadt, L.L.P.

(57) ABSTRACT

A clamp device is equipped with a clamp body, a piston rod, a link mechanism, a detection mechanism for detecting a state of rotary motion of a clamp arm, and a determination unit for determining whether a state of clamping exists. The detection mechanism includes a first proximity sensor, and a knuckle joint having a first sloped surface. The determination unit, on the basis of a comparison of an output signal (Continued)

from the first proximity sensor to a clamp threshold value, determines whether a state of clamping exists, and on the basis of a comparison to a clamping force generation threshold value, determines whether a state of generation of clamping force exists.

11 Claims, 7 Drawing Sheets

(51) Int. Cl.
*B25B 5/04* (2006.01)
*B25B 5/12* (2006.01)
*B23Q 17/00* (2006.01)
*B25B 5/02* (2006.01)

(58) Field of Classification Search
USPC .............................. 269/20, 24, 27, 32, 228
See application file for complete search history.

(56) References Cited

U.S. PATENT DOCUMENTS

| | | | |
|---|---|---|---|
| 6,540,217 | B2 | 4/2003 | Takahashi et al. |
| 6,869,068 | B2 * | 3/2005 | Zhao ........................ B25B 5/06 269/228 |
| 2004/0061268 | A1 * | 4/2004 | Sawdon ................. B25B 5/064 269/32 |
| 2004/0113342 | A1 * | 6/2004 | Tunkers .................... B25B 5/12 269/32 |
| 2004/0150149 | A1 | 8/2004 | Zhao et al. |
| 2011/0238213 | A1 | 9/2011 | Nagasaka et al. |
| 2014/0232051 | A1 | 8/2014 | Higurashi |
| 2015/0013145 | A1 | 1/2015 | Fujiwara et al. |

FOREIGN PATENT DOCUMENTS

| | | |
|---|---|---|
| CN | 103781591 A | 5/2014 |
| CN | 104275613 A | 1/2015 |
| JP | 11-005116 A | 1/1999 |
| JP | 2001-113468 A | 4/2001 |
| TW | 487617 B | 5/2002 |
| WO | WO-2013031652 A1 * | 3/2013 ............. G01B 7/003 |

OTHER PUBLICATIONS

Taiwanese Office Action dated Nov. 24, 2016, for Taiwan Patent Application 105100895 (with partial English Translation).
Combined Office Action and Search Report dated Oct. 31, 2018 in Chinese Patent Application No. 201680014236.8, citing documents AA and AO therein, 21 pages (with unedited computer generated English translation).
Indian Office Action Issued in Indian Patent Application No. 201747034690 dated Aug. 27, 2019, citing references AA and AO therein (6 pages).

* cited by examiner

CLAMP DEVICE

TECHNICAL FIELD

The present invention relates to a clamp device for clamping a workpiece by a rotatable clamp arm.

BACKGROUND ART

Conventionally, for example, in welding components such as automobiles, a clamp device is used to clamp the components. In this type of clamp device, the piston of the cylinder portion is displaced in the axial direction under the action of the fluid pressure, so that the clamp arm is rotated through a predetermined angle by a toggle link mechanism connected to the piston rod, for switching between a clamping state in which the workpiece can be clamped and an unclamping state in which the clamping state is released (see, for example, Japanese Laid-Open Patent Publication No. 2001-113468).

Further, in the clamp device disclosed in Japanese Laid-Open Patent Publication No. 2001-113468, the detection portion is connected to the knuckle block connected to the piston rod, and the detection portion is connected to the knuckle block by two proximity sensors provided on the side portion of the clamp body, whereby detecting the clamping state and the unclamping state.

SUMMARY OF INVENTION

In recent years, there has been a request in such a clamping device to not only detect the clamped state and the unclamped state of the workpiece, but also to detect whether or not a predetermined clamping force is reliably generated on the workpiece.

The present invention has been made in view of the above requests, and it is an object of the present invention to provide a clamp device capable of easily and reliably determining whether a predetermined clamping force is reliably generated on a workpiece with a simple structure.

A clamping device according to the present invention for clamping a workpiece includes a clamp body, a driving member linearly movable in a predetermined direction in the clamp body, a link mechanism configured to convert the linear motion of the driving unit into a rotational operation of a clamp arm, a detection unit configured to detect a rotation state of the clamp arm, and a determination unit configured to determine the clamp state based on an output from the detection unit, wherein the detection unit includes an object to be detected displaceable in the predetermined direction in accordance with the linear motion of the driving unit and a first proximity sensor configured to detect a position of the object to be detected, and the object to be detected includes a first inclined surface at a portion facing the first proximity sensor, the first inclined surface inclining toward a predetermined direction, the determination unit determines the clamp state based on a comparison between an output signal from the first proximity sensor and a predetermined clamp threshold value, and determines a clamping force generation state based on a comparison between the output signal from the first proximity sensor and a predetermined clamping force generation threshold value.

With such a configuration, after the clamp arm comes into contact with the workpiece, the linear motion of the driving member outputted to generate the clamping force on the workpiece is changed by changing the distance between the first inclined surface and the first proximity sensor. Therefore, it is possible to determine easily and reliably whether the clamping force is generated in the clamped state of the workpiece (a state in which a predetermined clamping force is generated on the workpiece).

In the above-described clamp device, the detection unit includes a second proximity sensor disposed apart from the first proximity sensor along the predetermined direction, and the object to be detected is provided with a second inclined surface at a position facing the second proximity sensor, the second inclined surface inclining toward the predetermined direction. The determination unit may determine the unclamp state is established based on a comparison between an output signal of the second proximity sensor and a predetermined unclamp threshold value.

According to such a configuration, since the linear motion of the driving member can be detected as a change in the distance between the second inclined surface and the second proximity sensor-, it is possible to easily and reliably determine the unclamp state.

The above-described clamp device may include a setting operation section operable by a user, and a threshold value setting unit configured to set a clamp threshold value based on the output signal from the first proximity sensor when a first setting operation is performed on the setting operation unit and set an unclamp threshold value based on the output signal from the second proximity sensor when a second operation is performed on the setting operation unit.

According to such a configuration, it is possible to easily set the clamp threshold value and the unclamp threshold value according to the shape and size of the workpiece to be clamped. In the above-described clamp device, the threshold value setting unit may set the clamping force generation threshold value based on the output signal from the first proximity sensor when a third operation is performed on the setting operation unit.

With such a configuration, it is possible to set the clamping force generation threshold easily without changing the position of the first proximity sensor.

The claim device may includes a clamp lamp which is disposed so as to be visible from the outside and is turned on when the determination unit determines the clamp state, and an unclamp lamp which is disposed so as to be visible from the outside and is turned on when the determination unit determines the unclamp state.

With such a configuration, the user can easily confirm the clamped state and the unclamped state of the workpiece.

In the above clamp device, it is preferable to provide a clamping force generation lamp, which is disposed so as to be visible from the outside and is turned on when the determination unit determines the clamping force generation state.

With such a configuration, the user can easily confirm the clamping force generation state on the workpiece.

The above-mentioned clamp device may further include a speed calculation unit configured to calculate a rotation speed of the clamp arm based on the output signal from the first proximity sensor and the output signal from the second proximity sensor, and a speed determination unit configured to determine whether or not the rotational speed calculated by the speed calculation unit is equal to or less than a predetermined speed threshold value.

According to such a configuration, it is possible to prevent damage to the workpiece and components of the clamping device, such as a link mechanism, due to an excessively increased rotational speed of the clamp arm.

In the clamp device described above, it is preferable to provide a speed lamp that is disposed so as to be visible from the outside and that is turned on when the speed determination unit determines the rotational speed exceeding the speed threshold value.

With such a configuration, the user can easily check if the rotational speed of the clamp arm is equal to or less than the speed threshold value.

In the clamp device described above, the object to be detected may be made of a metal material, and the first proximity sensor and the second proximity sensor may be inductive proximity sensors.

According to such a configuration, as compared with the case of using a magnetic detection sensor, the sensitivity to a direct current magnetic field generated in welding is low. Therefore, even in the case of using the clamp device in a welding environment, it is possible to operate the first proximity sensor and the second proximity sensor more stably.

The clamping device may further include a cylinder tube and a piston reciprocating in the cylinder tube along an axial direction under the action of fluid pressure. The driving member may be a piston rod connected to the piston, and the object to be detected may be a knuckle joint that connects the piston rod and the link mechanism to each other.

According to such a configuration, it is unnecessary to attach a separate part as the object to be detected, and the number of parts and the number of working steps can be reduced.

In the above-described clamping device, the first proximity sensor and the second proximity sensor may be disposed in a clamp body including a metal material.

According to such a configuration, the clamp device can be downsized as compared with the case where the first proximity sensor and the second proximity sensor are disposed outside the clamp body. In addition, since the clamp body functions as a magnetic shield, it is less likely to be affected by the direct current magnetic field generated in welding.

According to the present invention, after the clamp arm comes in contact with the workpiece, the linear motion of the driving member outputted to generate the clamping force on the workpiece is detected as a change in the distance between the first inclined face and the first proximity sensor. It is possible to easily and reliably determine whether or not the clamping force is generated (a state where a predetermined clamping force is generated on the workpiece) in the clamped state of the workpiece.

The above objects, features, and advantages will be readily understood from the following description of embodiments with reference to the accompanying drawings.

DESCRIPTION OF EMBODIMENTS

Preferred embodiments of the clamp device according to the present invention will be described below with reference to the accompanying drawings.

Figure 1:
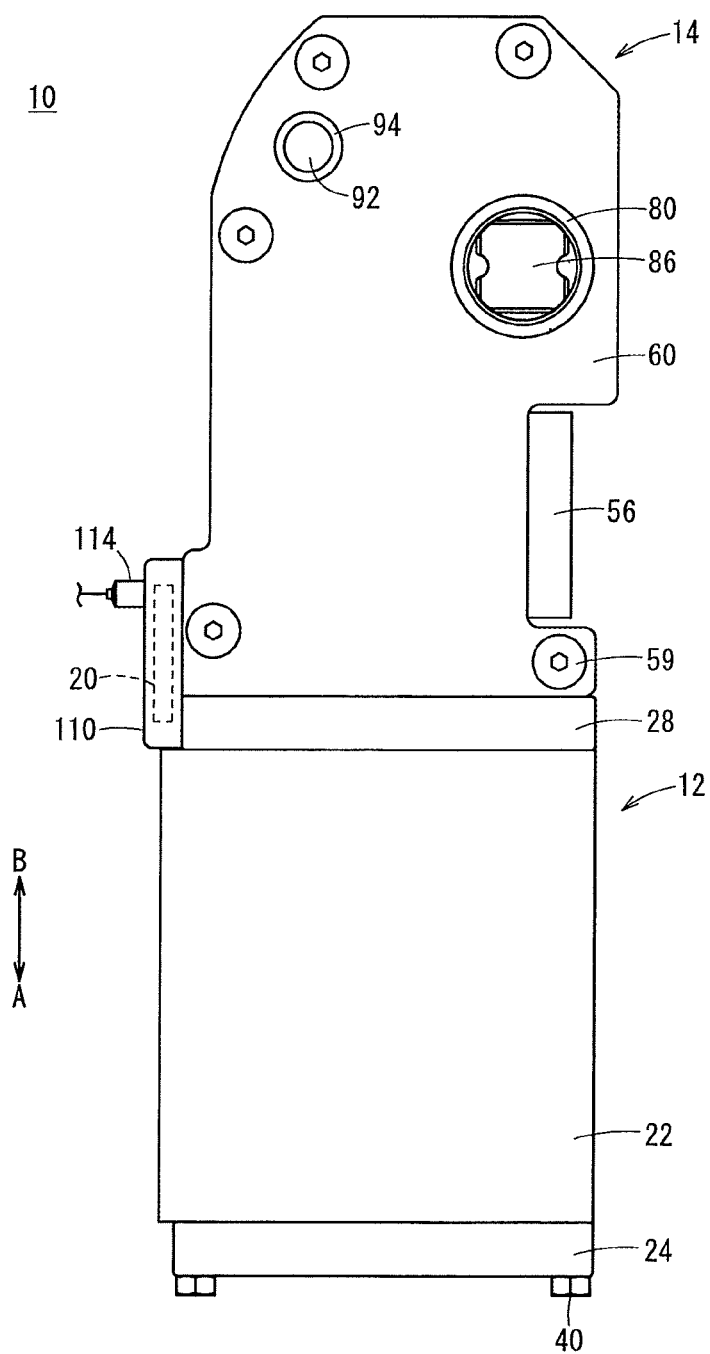
FIG. 1 is a front view of a clamp device according to a first embodiment of the present invention.
Figure 2:
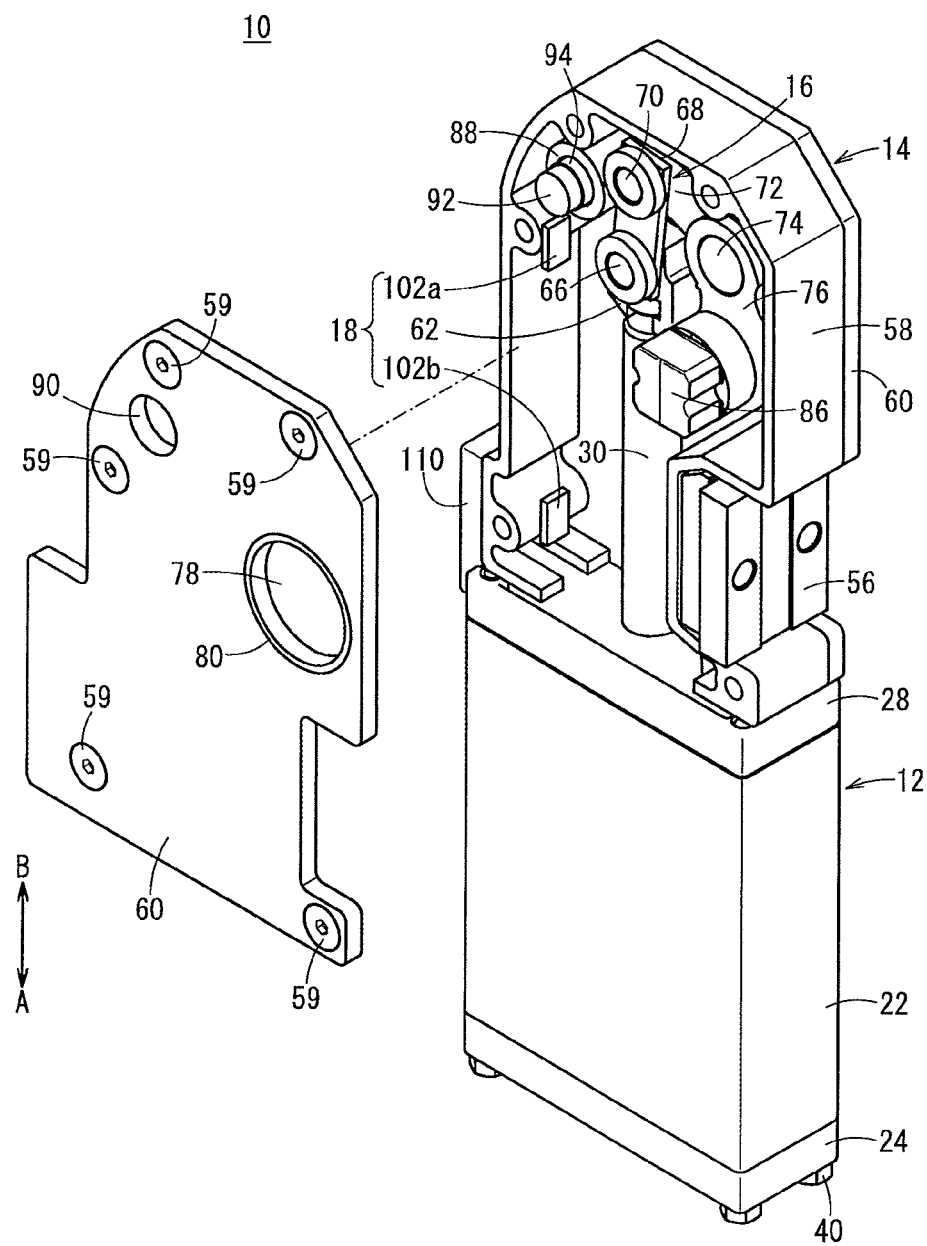
FIG. 2 is a partially exploded perspective view of the clamp device shown in FIG. 1.
Figure 3:
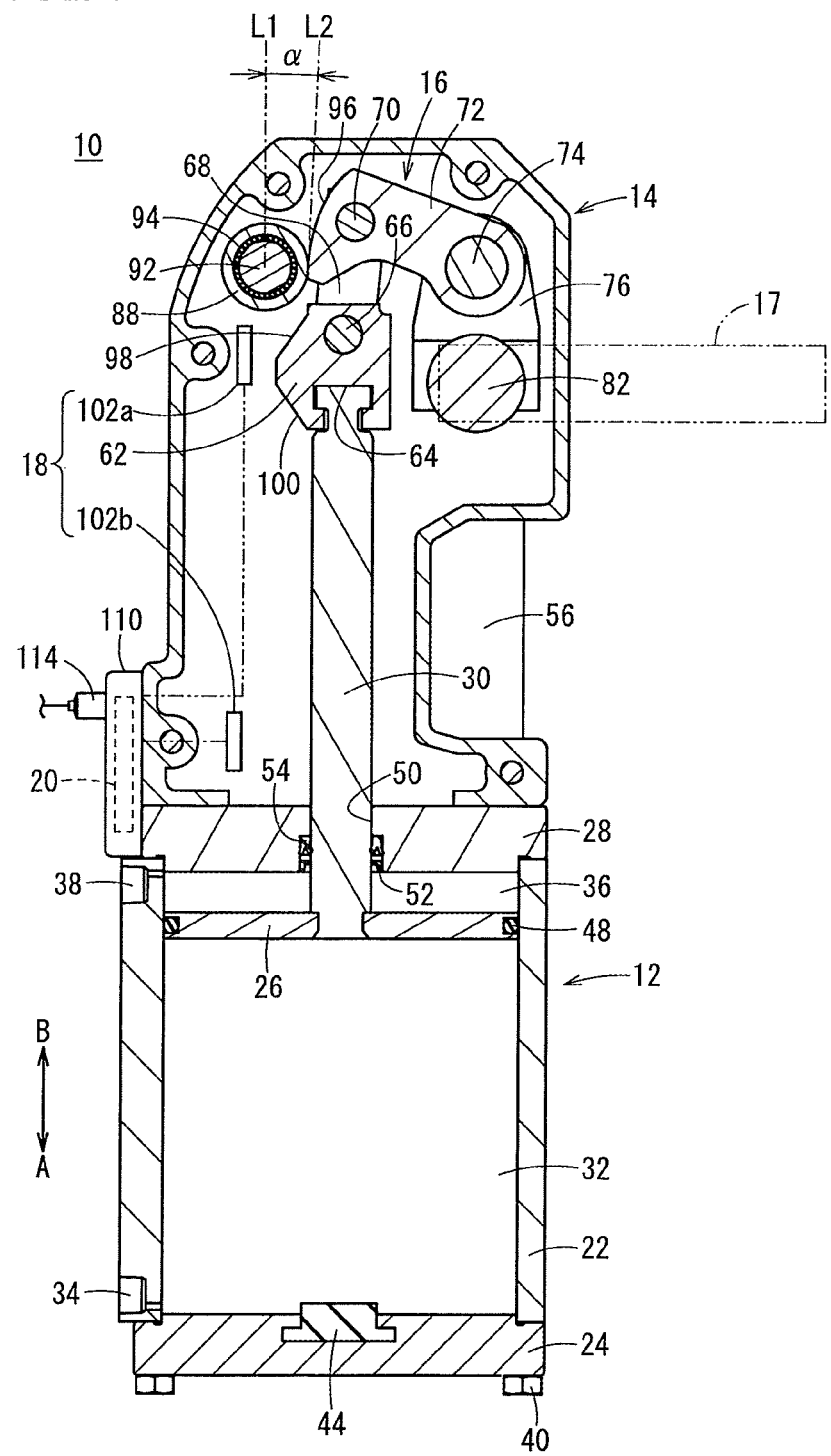
FIG. 3 is a longitudinal cross-sectional view showing the clamping state of the clamp device shown in FIG. 1.

As shown in FIGS. 1 to 3, a clamp device 10 according to an embodiment of the present invention includes: a driving mechanism 12; a clamp body 14 connected to the driving mechanism 12; a link mechanism 16 arranged inside the clamp body 14; a clamp arm 17 which rotates through the link mechanism 16 under the action of the driving mechanism 12; a detection mechanism (detecting means) 18 which detects a rotational position of the clamp arm 17; and a control unit 20.

The driving mechanism 12 is configured as a fluid pressure cylinder, and includes: a cylinder tube 22 configured in a flat tubular shape; an end block 24 that closes an opening in one end side (direction of the arrow A) of the cylinder tube 22; a piston 26 disposed displaceably in the axial direction in the cylinder tube 22; a rod cover 28 for closing an opening in the other end side (direction of the arrow B) of the cylinder tube 22; and a piston rod 30 (driving member) connected to the piston 26.

The cylinder tube 22 is not limited to the flat tubular shape but may be of any shape such as a true cylindrical shape or an elliptical cylindrical shape. The cylinder tube 22 is provided with a first port 34 communicating with a first cylinder chamber 32 formed between the end block 24 and the piston 26, and a second port 38 communicating with a second cylinder chamber 36 formed between the piston 26 and the rod cover 28.

A tube (not shown) for supplying and discharging a compressed fluid (driving fluid) for reciprocating the piston 26 is connected to the first port 34 and the second port 38. The end block 24, the cylinder tube 22, and the rod cover 28 are integrally connected by a plurality of fastening bolts 40.

A damper 44 for buffering the impact of the piston 26 and the collision noise is attached to the substantially central portion of the end block 24. An annular piston packing 48 is mounted in a groove in the outer peripheral surface of the piston 26. One end side of the piston rod 30 is fixed to the center of the piston 26. A rod hole 50 through which the piston rod 30 is inserted is formed in a central portion of the rod cover 28. An annular rod packing 52 and an annular dust seal 54 are respectively attached, via a groove, to the wall surface defining the rod hole 50.

The clamp body 14 is connected to the other end side of the rod cover 28, and is configured to include, for example, a metal material such as iron, stainless steel, aluminum, or the like. The clamp body 14 is provided with a bracket 56 for attaching the clamp device 10 to a fixed member (not shown).

As shown in FIG. 2, the clamp body 14 includes a frame portion 58 having openings on both sides, a pair of cover portions 60 fastened to the frame portion 58 by a plurality of screw members 59 so as to close the opening of the frame portion 58. As a result, a chamber in which the other end side of the piston rod 30 and the link mechanism 16 can be disposed is formed in the clamp body 14. The link mechanism 16 is connected to the other end portion of the piston rod 30 via a knuckle joint 62.

As shown in FIG. 3, in a portion of the knuckle joint 62 oriented to the piston rod 30, a groove portion 64 having a substantially T-shaped cross section and extending in a direction orthogonal to the axial direction of the piston rod 30 is formed. The other end portion of the piston rod 30 is mounted in the groove portion 64. Further, in the knuckle joint 62, a hole portion extending along a direction orthogonal to the cover portion 60 (a direction orthogonal to the paper surface of FIG. 3) is formed. A knuckle pin 66 is inserted through the hole portion.

The knuckle joint 62 is made of a metal material that generates an eddy current loss such as iron. As shown in FIG. 3, in the clamped state of the workpiece, a first inclined surface 98 and a second inclined surface 100 are formed in a portion of the knuckle joint 62 that points toward the opposite side (the left side in FIG. 3) from the clamp arm 17.

In FIG. 3, the first inclined surface 98 and the second inclined surface 100 are formed as inclined surfaces gradually incline from the center of the knuckle joint 62 toward the side opposite to the piston rod 30 (the direction of the arrow B) and the side of the piston rod 30 (the direction of the arrow A). The positions of the first inclined surface 98 and the second inclined surface 100 are detected by a first proximity sensor 102a and a second proximity sensor 102b which will be described later. That is, the knuckle joint 62 functions as an object to be detected by the first proximity sensor 102a and the second proximity sensor 102b.

The link mechanism 16 converts the reciprocating motion (linear motion) of the piston 26 into a rotating motion of a rotatable shaft 82 described later. The link mechanism 16 includes a first link portion 68 rotatably provided on the knuckle joint 62 via the knuckle pin 66, a second link portion 72 rotatably provided on the first link portion 68 via a first pin 70 and a support lever 76 rotatably provided on the second link portion 72 via a second pin 74.

In the first link portion 68, a hole portion through which the knuckle pin 66 is inserted and a hole portion through which the first pin 70 is inserted are formed separately from each other. In the second link portion 72, a hole portion through which the first pin 70 is inserted and a hole portion through which the second pin 74 is inserted are formed separately from each other.

The rotatable shaft 82 supported by a bearing 80 inserted through a hole portion 78 of the cover portion 60 is fixed to the support lever 76. The first pin 70, the second pin 74, and the rotatable shaft 82 are arranged parallel to the knuckle pin 66. An arm-supporting portion 86 to which the clamp arm 17 is attached is fixed to an end portion of the rotatable shaft 82. That is, the rotatable shaft 82 rotates integrally with the clamp arm 17.

The linear motion of the piston rod 30 is transmitted to the knuckle joint 62, the first link portion 68, the second link portion 72, and the support lever 76, and the support lever 76 is rotated and displaced through a predetermined angle together with the rotatable shaft 82. With the rotational displacement of the rotatable shaft 82, the clamp arm 17 connected to the rotatable shaft 82 via the arm-supporting portion 86 rotates.

Further, in the present embodiment, a guide roller 88 is provided near the link mechanism 16. The guide roller 88 is rotatably provided to a pin member 92 inserted through a hole 90 in the cover portion 60 via a plurality of rolling elements 94. Then, a predetermined working surface 96 of the second link portion 72 comes into contact under the rotation operation of the second link portion 72 constituting the link mechanism 16, whereby the guide roller 88 rotates.

The working surface 96 of the second link portion 72 is formed so that the contact angle α between the working surface 96 and the guide roller 88 is constant as long as it is in contact with the guide roller 88. Here, the contact angle α is an angle formed between a line segment L1 orthogonal to the rotation axis of the guide roller 88 in a state parallel to the axis of the piston rod 30 and a tangent line L2 on the working surface 96 of the guide roller 88.

As a result, while the working surface 96 of the second link portion 72 is in contact with the guide roller 88, a substantially constant clamping force can be continuously generated against the workpiece. In other words, the effective range (the width of the rotation angle of the clamp arm 17) in which a predetermined clamping force can be generated on the workpiece can be made relatively broad. This makes it possible to generate a predetermined clamping force on the workpiece without unnecessarily increasing the pressure of the compressed fluid for driving the fluid pressure cylinder even when the dimensional variation of the workpiece is relatively large.

The detection mechanism 18 is composed of a knuckle joint (object to be detected) 62 displaced in a stroke together with the piston rod 30, and the first proximity sensor 102a and the second proximity sensor 102b. The first proximity sensor 102a and the second proximity sensor 102b are disposed in the clamp body 14 at predetermined intervals along a direction (arrows AB direction) in which the piston rod 30 is displaced in the stroke.

The first proximity sensor 102a is disposed on the other end side (the direction of arrow B) of the piston rod 30 in the clamp body 14, and detects the position of the first inclined surface 98 of the knuckle joint 62. The second proximity sensor 102b is disposed on the one end side (in the direction of arrow A) of the piston rod 30 in the clamp body 14 and detects the position of the second inclined surface 100 of the knuckle joint 62. Since the second proximity sensor 102b has the same constituent elements as the first proximity sensor 102a, in the following description, the same reference numerals are assigned to the same constituent elements, and a detailed description thereof will be omitted. It is to be noted that the subscripts "a" are attached to the reference numerals of the components of the first proximity sensor 102a and the subscripts "b" are attached to the reference numerals of the constituent elements of the second proximity sensor 102b.

Figure 4:
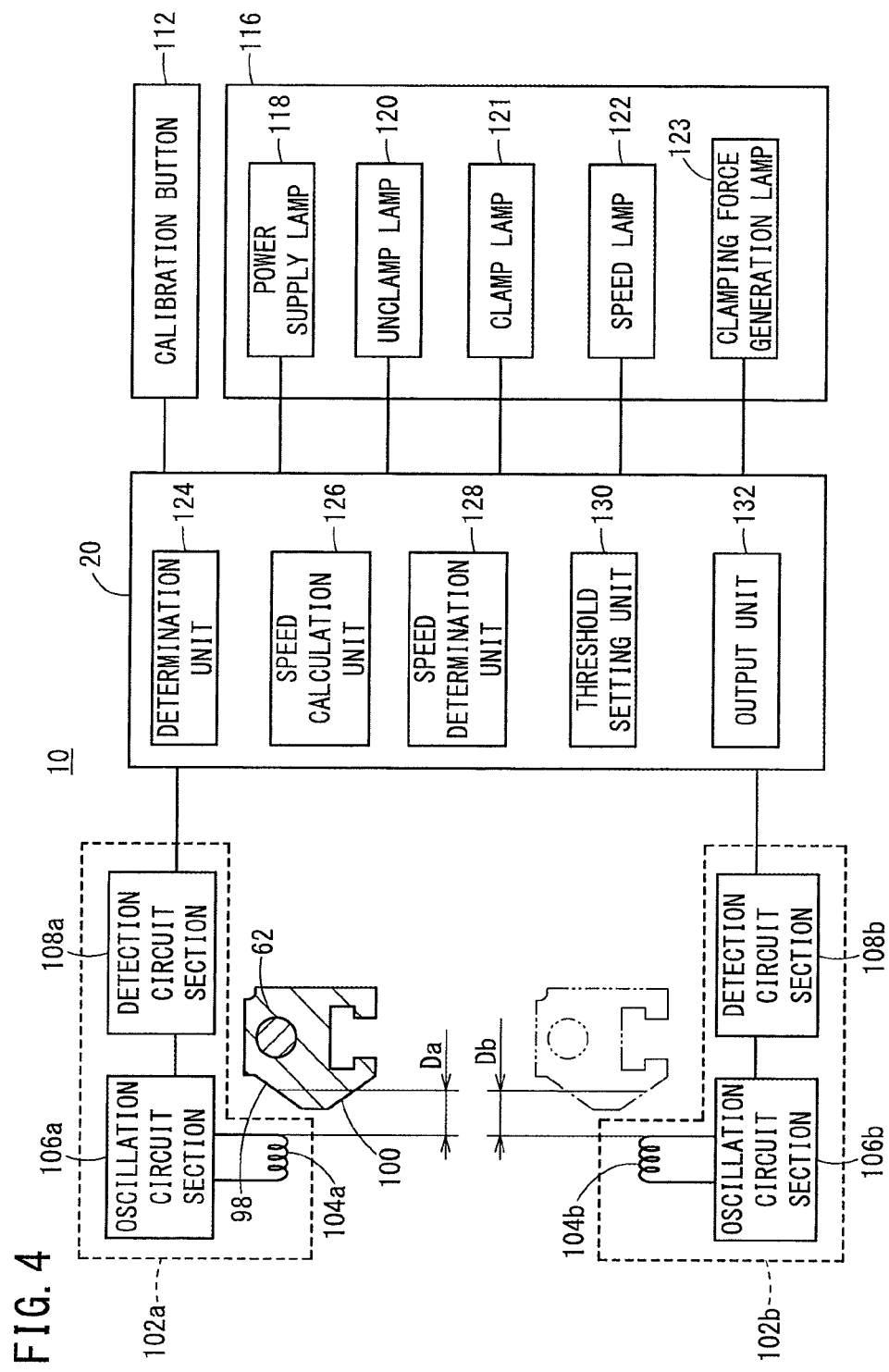
FIG. 4 is a block diagram of the clamp device shown in FIG. 1.

As shown in FIG. 4, in the present embodiment, the first proximity sensor 102a is configured as an induction-type proximity sensor, and includes a detection coil 104a, an oscillation circuit section 106a electrically connected to the detection coil 104a, and a detection circuit section 108a electrically connected to the oscillation circuit section 106a.

The detection coil 104a is disposed so that its coil surface faces in proximity to a first inclined surface 98 of the knuckle joint 62. The oscillation circuit section 106a oscillates and drives the detection coil 104a at a predetermined oscillation frequency. The detection circuit section 108a detects the resonance impedance based on the output signal of the oscillation circuit section 106a. That is, the first proximity sensor 102a detects the change in the distance Da between the first inclined surface 98 and the detection coil 104a in accordance with the reciprocating motion of the piston 26, as a change in the resonance impedance, whereby the position of the first inclined surface 98 is detected.

The control unit 20 is accommodated in a casing 110 (see FIG. 3) provided in the clamp body 14, and the first proximity sensor 102a and the second proximity sensor 102b are electrically connected by a lead wire or the like. The casing 110 is provided with a calibration button (setting operation section) 112 which can be pressed from the outside by a user, a connector 114 to which a cable or the like connected to an external device (power supply or the like) can be connected, and a display unit 116 viewable from the outside. The display unit 116 includes a power lamp 118, an unclamp lamp 120, a clamp lamp 121, a speed lamp 122 and a clamping force generation lamp 123.

The control unit 20 includes a determination unit 124, a speed calculation unit 126, a speed determination unit 128, a threshold value setting unit 130, and an output unit 132.

Based on a comparison between the resonance impedance (hereinafter referred to as "detected resonance impedance Za") detected by the detection circuit section 108a of the first proximity sensor 102a and the clamp threshold value Z1, the determination unit 124 determines whether or not the clamp state is established. Based on a comparison between the resonance impedance (hereinafter referred to as "detected resonance impedance Zb") detected by the detection circuit section 108b of the second proximity sensor 102b and the unclamp threshold value Z2, the determination unit 124 determines whether or not the unclamp state is established.

Further, when the determination unit 124 determines that the workpiece is in the clamped state, the determination unit 124 further determines whether or not a predetermined clamping force is generated on the workpiece (whether or not the workpiece is under the clamping force generation state). Specifically, based on a comparison between the detected resonance impedance Za, which is the output signal of the first proximity sensor 102a, and the predetermined clamping force generation threshold Z3, the determination unit 124 determines whether the clamping force is generated.

The speed calculation unit 126 measures the time during which the knuckle joint 62 moves between the first proximity sensor 102a and the second proximity sensor 102b, and calculates the rotation speed of the clamp arm 17 based on the measured movement time.

The speed determination unit 128 determines whether the rotational speed of the clamp arm 17 calculated by the speed calculation unit 126 is equal to or less than the speed threshold value. It should be noted that the speed threshold value is stored in advance in the storage unit (not shown) of the control unit 20. Further, the speed determination unit 128 may determine whether the rotational speed of the clamp arm 17 calculated by the speed calculation unit 126 is equal to or greater than the speed threshold value.

The threshold value setting unit 130 sets the predetermined clamp threshold value Z1, the unclamp threshold value Z2 and the clamping force generation threshold value Z3. Specifically, the threshold value setting unit 130 sets the clamp threshold value Z1 based on the output signal from the detection circuit section 108a as the detected resonance impedance Za at the time of the first operation on the calibration button 112 (for example, the operation of keeping the button pressed over a predetermined time). Further, the threshold value setting unit 130 sets the unclamp threshold value Z2 based on the output signal from the detection circuit section 108b as the detected resonance impedance Zb at the time of the second operation on the calibration button 112 (for example, the operation of pressing the calibration button 112 for less than the predetermined time).

Further, the threshold value setting unit 130 sets the value of the detected resonance impedance Za of the first proximity sensor 102a as the clamping force generation threshold value Z3 at the time of the third operation on the calibration button 112 (for example, an operation of pressing the calibration button 112 two times in a row), in a state in which the workpiece is clamped by the clamp arm 17 with a predetermined clamping force. Thus, the clamping threshold value Z1, the unclamping threshold value Z2, and the clamping force generation threshold value Z3 can easily be changed according to the shape and size of the workpiece to be clamped. The clamp threshold value Z1, the unclamping threshold value Z2, and the clamping force occurrence threshold value Z3 set by the threshold value setting unit 130 are stored in a storage unit (not shown) of the control unit 20.

The output unit 132 turns on or turns off the unclamp lamp 120, the clamp lamp 121, the speed lamp 122 and the clamping force generation lamp 123, based on the determination results by the determination unit 124.

Figure 5:
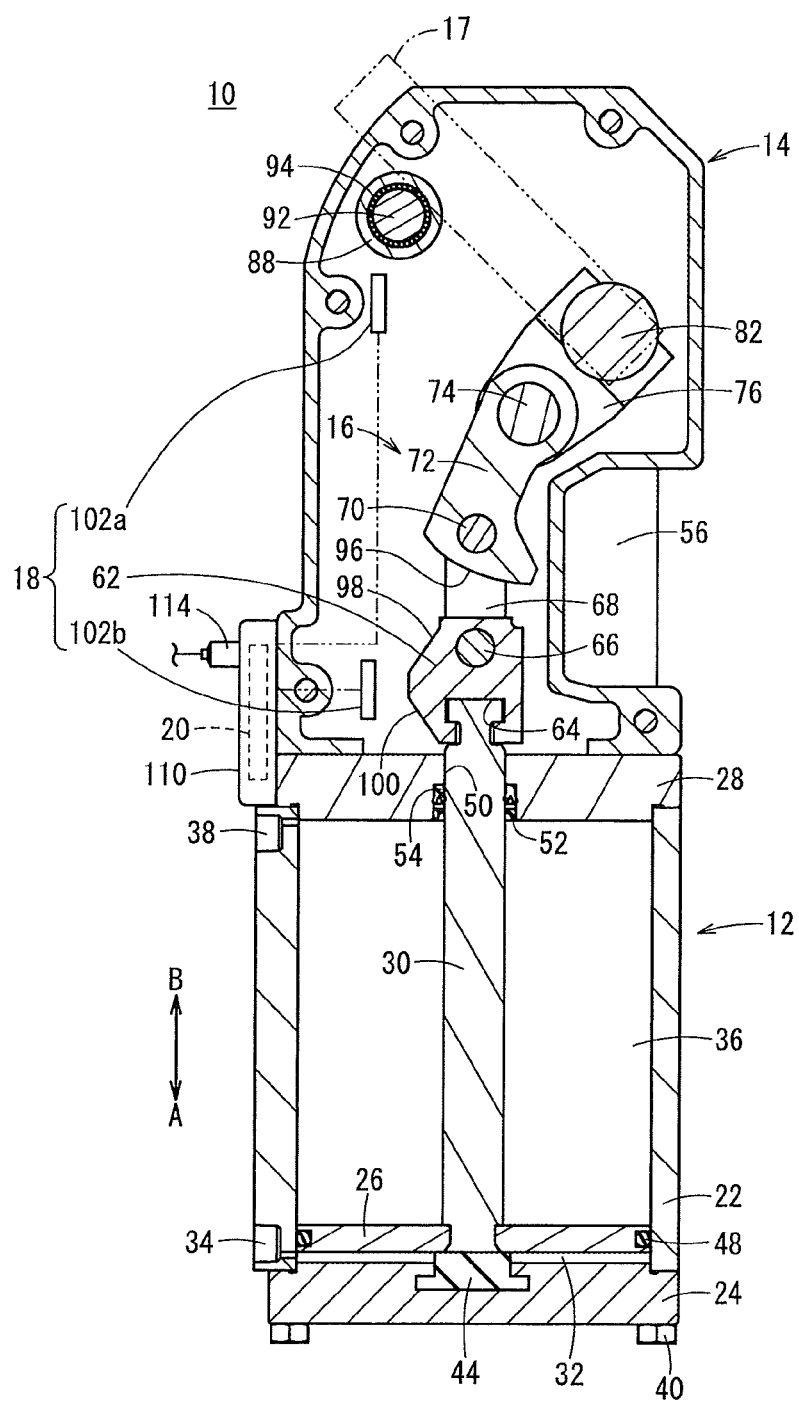
FIG. 5 is a longitudinal cross-sectional view showing the unclamp state of the clamp device shown in FIG. 1.

The clamp device 10 according to the present embodiment is basically configured as described above, and the operation and effects thereof will now be described. It is assumed that the unclamp state shown in FIG. 5 is the initial state.

First, the user attaches the bracket 56 of the clamp device 10 to a fixed member (not shown). Further, by connecting the cable to the connector 114, the clamp device 10 is connected to an external device (power source or the like). As a result, power is supplied to the control unit 20, and the power lamp 118 is turned on. In the initial state, the unclamp lamp 120 is turned on, the clamp lamp 121 and the clamping force generation lamp 123 are turned off, and the piston 26 is positioned on the one end side of the cylinder tube 22 and is in contact with the damper 44.

When clamping the workpiece, the compressed fluid is supplied to the first port 34 with the second port 38 open to the atmosphere. Then, as shown in FIG. 3, the piston 26 is displaced toward the rod cover 28 (the direction of the arrow B). The linear motion of the piston 26 is transmitted to the link mechanism 16 via the piston rod 30 and the knuckle joint 62, and the rotatable shaft 82 and the clamp arm 17 are integrally rotated in a clockwise direction, under the rotational action of the support lever 76 constituting the link mechanism 16.

Figure 6:
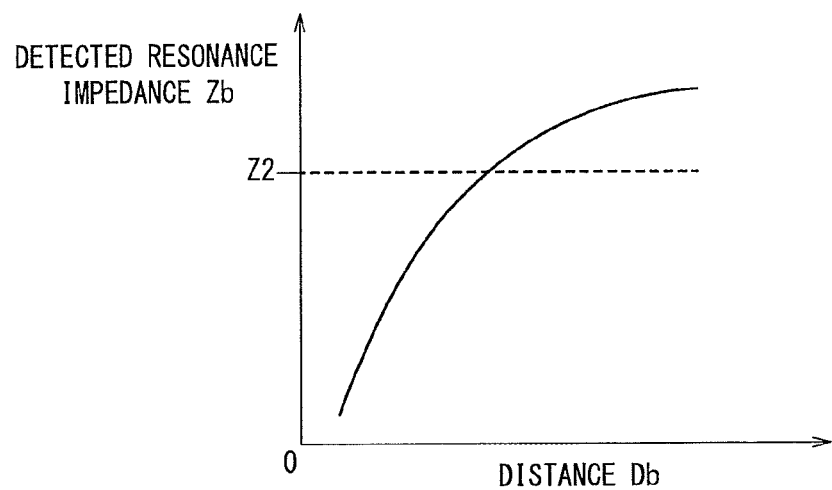
FIG. 6 is a graph showing the relationship between the distance between a second inclined surface and a detection coil and the detected resonance impedance.

At this time, since the knuckle joint 62 and the piston rod 30 are integrally displaced, the distance Db between the second inclined surface 100 and a detection coil 104b of the second proximity sensor 102b gradually becomes large and the detected resonance impedance Zb becomes large (see FIG. 6).

When the detected resonance impedance Zb is smaller than the unclamp threshold value Z2, the determination unit 124 determines the unclamp state. At this time, the output unit 132 continues to turn the unclamp lamp 120 on.

As the piston 26 further displaces toward the rod cover 28, the second inclined surface 100 of the knuckle joint 62 displaces from a position facing the second proximity sensor 102b toward the link mechanism 16 (in the direction of the arrow B in FIG. 3), so that the detected resonance impedance Zb becomes equal to or larger than the unclamp threshold value Z2. At this time, the determination unit 124 determines an intermediate state (a transition state from the unclamp state to the clamp state). When the determination unit 124 determines the intermediate state, the output unit 132 turns off the unclamp lamp 120 while the clamp lamp 121 is kept turned off. As a result, the user can confirm that the workpiece is in the intermediate state by visually confirming the unclamp lamp 120 and the clamp lamp 121 turned off.

Subsequently, when the piston 26 further displaces toward the rod cover 28 side, the clamp arm 17 comes into contact with the workpiece by further rotation of the rotatable shaft 82, and reaches the position where the first inclined surface 98 of the knuckle joint 62 faces the first proximity sensor 102a. At this time, the separation distance Da between the first inclined surface 98 and the detection coil 104a of the first proximity sensor 102a gradually decreases and the detected resonance impedance Za gradually decreases (see FIG. 7). Subsequently, when the detected resonance impedance Za becomes smaller than the clamp threshold value Z1, the determination unit 124 determines the clamp state. When the determination unit 124 determines the clamp state, the output unit 132 turns on the clamp lamp 121 with the unclamp lamp 120 turned off. As a result, the user can confirm that the workpiece is in the clamped state by viewing the clamp lamp 121 turned on.

In this clamp state, the piston 26 is further displaced toward the rod cover 28 and the working surface 96 of the second link portion 72 contacts the guide roller 88, whereby a predetermined clamping force is generated on the workpiece. Substantially, a constant clamping force is maintained on the workpiece until the displacement of the piston 26 toward the rod cover 28 side is stopped.

Figure 7:
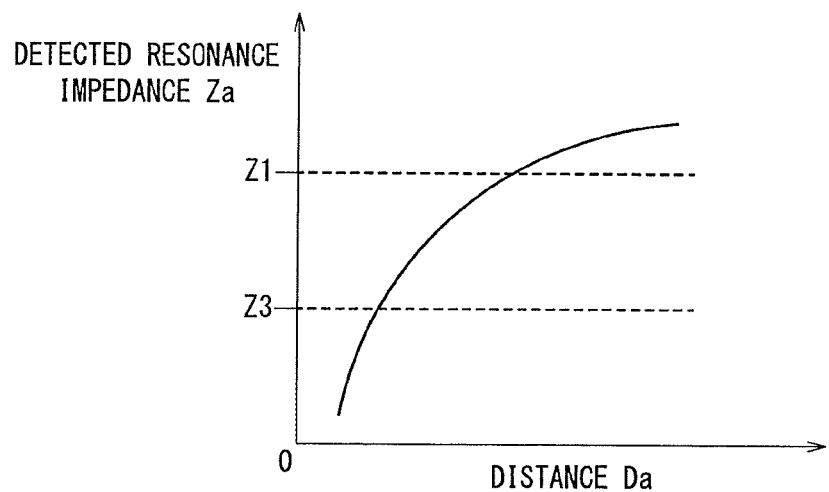
FIG. 7 is a graph showing the relationship between the distance between a first inclined surface and the detection coil and the detected resonance impedance.

At this time, the knuckle joint 62 is further displaced in the axial direction integrally with the piston rod 30, the distance Da between the first inclined surface 98 and the detection coil 104a of the first proximity sensor 102a is further shortened and the detected resonance impedance Za gradually decreases (See FIG. 7).

After determining that the workpiece is in the clamped state based on the comparison between the detected resonance impedance Za of the first proximity sensor 102a and the clamp threshold value Z1, the determination unit 124 further determines whether the clamping force is generated based on the comparison between the detected resonance impedance Za and the clamping force generation threshold value Z3. That is, when the detected resonance impedance Za is equal to or less than the clamping force generation threshold Z3, the determination unit 124 determines the clamping force generation state in which a predetermined clamping force is generated on the workpiece. When the determination unit 124 determines the clamping force generation state, the output unit 132 turns on the clamping force generation lamp 123. By visually confirming the clamping force generation lamp 123, the user can easily confirm the clamping force generation state.

Meanwhile, the speed calculating unit 126 measures the time during which the clamp arm 17 changes from the unclamp state to the clamp state, and calculates the rotational speed of the clamp arm 17 based on the measured time.

Specifically, the speed calculating unit 126 measures the time from when the detected resonance impedance Zb of the second proximity sensor 102b becomes larger than the unclamp threshold value Z2 (that is, the time point commencing the transition state from the unclamp state to the clamp state) to when the detected resonance impedance Za of the first proximity sensor 102a becomes smaller than the clamp threshold value Z1 (that is, the time point commencing the clamp state). Based on the measured time, the speed calculating unit 126 calculates the rotational speed of the clamp arm 17 (clamp speed) at the time of clamping. Then, the speed determination unit 128 determines if the clamping speed is equal to or less than the speed threshold value (a clamping speed threshold value).

When the speed determination unit 128 determines that the clamping speed exceeds the clamping speed threshold value, the output unit 132 turns on the speed lamp 122. This allows the user to adjust the supply rate of the compressed fluid to an appropriate clamping speed. That is, it is possible to prevent the clamping speed from becoming excessively large, the clamp arm 17 and the workpiece, etc. from being scratched, and the components (for example, the link mechanism 16, etc.) of the clamp device 10 from being damaged.

On the other hand, when releasing the clamped state of the workpiece, the compressed fluid is supplied to the second port 38 while the first port 34 is open to the atmosphere. Then, as shown in FIG. 5, the piston 26 is displaced to the end block 24 side. The linear motion of the piston 26 is transmitted to the link mechanism 16 via the piston rod 30 and the knuckle joint 62, and the rotatable shaft 82 and the clamp arm 17 rotate integrally in a counterclockwise direction, under the rotational action of the support lever 76 constituting the link mechanism 16.

At this time, since the knuckle joint 62 is displaced integrally with the piston rod 30, the distance Da between the first inclined surface 98 and the detection coil 104a of the first proximity sensor 102a gradually increases and the detected resonance impedance Za increases (See FIG. 7).

When the detected resonance impedance Za becomes equal to or larger than the clamp threshold value Z1, the determination unit 124 determines the intermediate state (the transition state from the clamp state to the unclamp state). When the determination unit 124 determines the intermediate state, the output unit 132 turns off the clamp lamp 121. Subsequently, when the detected resonance impedance Zb becomes smaller than the unclamp threshold value Z2 due to further displacement of the piston 26 toward the end block 24 side, the determination unit 124 determines the unclamp state (see FIG. 6). When the determination unit 124 determines the unclamp state, the output unit 132 turns on the unclamp lamp 120 with the clamp lamp 121 turned off.

The user can confirm that the workpiece is in the unclamped state by viewing the unclamp lamp 120 turned on. Thereafter, as the piston 26 contacts the damper 44, the displacement of the piston 26 toward the end block 24 side is stopped, and the rotation of the rotatable shaft 82 and the clamp arm 17 is stopped.

Further, the speed calculating unit 126 measures the time required for changing the clamp arm 17 from the clamp state to the unclamp state, and calculates the rotational speed of the clamp arm 17 based on the measured time.

Specifically, the speed calculating unit 126 measures the time from when the detected resonance impedance Za of the first proximity sensor 102a becomes larger than the clamp threshold value Z1 (that is, the time point commencing the transaction state from the clamp state to the unclamp state) to when the detected resonance impedance Zb of the second proximity sensor 102b becomes smaller than the unclamp threshold value Z2 (that is, the time point commencing the unclamp state). Based on the measured time, the speed calculating unit 126 calculates the rotational speed of the clamp arm 17 (unclamp speed) at the time of unclamping. Then, the speed determination unit 128 determines if the unclamping speed is equal to or less than the speed threshold (unclamping speed threshold). It should be noted that the unclamping speed threshold value may be the same as or different from the clamping speed threshold value.

When it is determined by the speed determination unit 128 that the unclamping speed exceeds the unclamping speed threshold value, the output unit 132 turns on the speed lamp 122. This allows the user to adjust the supply rate of the compressed fluid to achieve an appropriate unclamping speed. Therefore, it is possible to prevent the unclamping speed from becoming excessively large, and the components (for example, the link mechanism 16, etc.) of the clamp device 10 from being damaged.

In the above-described clamp device 10, for example, setting of the clamp threshold value Z1, the unclamp threshold value Z2 and the clamping force generation threshold value Z3 are performed according to the shape and size of the workpiece.

When changing the clamp threshold value Z1, the piston 26 is displaced toward the rod cover 28 under the action of the fluid pressure, so that the workpiece is clamped by bringing the clamp arm 17 into contact with the workpiece. Then, in this state, the user continuously presses (holds down) the calibration button 112 for a predetermined time (for example, 3 seconds) or more (first operation). As a result, the value of the detected resonance impedance Za of the first proximity sensor 102a at this time is set as the new clamp threshold value Z1, and stored in the storage unit of the control unit 20.

Further, when changing the unclamp threshold value Z2, the user presses (taps on) the calibration button 112 for less than a predetermined time (for example, about 1 second) while the clamp arm 17 is positioned at a predetermined rotation angle (unclamping angle) (second operation). As a result, the value of the detected resonance impedance Zb of the second proximity sensor 102b at this time is set as a new unclamp threshold value Z2, and stored in the storage unit of the control unit 20.

In the case of changing the clamping force generation threshold Z3, the user continuously presses the calibration button 112 twice (third operation) in a state where the work is clamped by the clamp arm 17 with a predetermined clamping force. As a result, the value of the detected resonance impedance Za of the first proximity sensor 102a at this time is set as a new clamping force generation threshold Z3 and stored in the storage unit of the control unit 20.

As described above, even when changing the shape and size of the workpiece, by pressing the calibration button 112 with the clamp arm 17 positioned at the predetermined rotation angle, the clamp threshold value Z1, the unclamp threshold value Z2 and the clamping force generation threshold value Z3 can be reset easily. By changing the pressing time of the calibration button 112, it is possible to set all the three values of the clamp threshold value Z1, the unclamp threshold value Z2 and the clamping force generation threshold value Z3 with one calibration button 112.

According to the present embodiment, the knuckle joint 62, which is displaced in a predetermined direction in accordance with the linear motion of the piston rod 30, is provided with a first inclined surface 98, which is inclined with respect to the predetermined direction at a portion facing the first proximity sensor 102a. The determination unit 124 determines the clamp state based on the comparison between the output signal of the first proximity sensor 102a and the predetermined clamp threshold value Z1, and determines the clamping force generation state based on the comparison between the output signal of the first proximity sensor 102a and the predetermined clamping force generation threshold value Z3. After the clamp arm 17 comes into contact with the workpiece, the linear motion (displacement of the piston 26) of the piston rod 30 output to generate a clamping force on the workpiece can be detected by the change in the distance Da between the first inclined surface 98 and the first proximity sensor 102a. Therefore, it can be easily and reliably determined whether the clamping force is generated in the clamped state of the workpiece.

Further, the knuckle joint 62 has a second inclined surface 100 that is inclined in the predetermined direction at a position facing the second proximity sensor 102b. The determination unit 124 determines the unclamp state based on the comparison between the output signal of the second proximity sensor 102b and the unclamp threshold value Z2. That is, since the linear motion (displacement of the piston 26) of the piston rod 30 can be detected by the change in the distance Db between the second inclined surface 100 and the second proximity sensor 102b, the unclamp state can be easily and reliably determined.

Furthermore, the clamp device includes the calibration button 112 that can be operated by the user and the threshold value setting unit 130 which sets the clamp threshold value Z1 based on the output signal from the first proximity sensor 102a at the time of the first operation on the calibration button 112, and the unclamping threshold value Z2 based on the output signal from the second proximity sensor 102b at the time of the second operation on the calibration button 112. Therefore, it is possible to easily set the clamp threshold value Z1 and the unclamp threshold value Z2, depending on the shape and size of the workpiece to be clamped. Further, the threshold value setting unit 130 sets the clamping force generation threshold value Z3 based on the output signal from the first proximity sensor 102a at the time of the third operation on the calibration button 112. Therefore, the clamping force generation threshold value Z3 can be set without changing the position of the first proximity sensor 102a.

Furthermore, since the clamp lamp 121 is turned on when it is determined to be in the clamp state and the unclamp lamp 120 is turned on when it is determined to be in the unclamp state, the user can confirm the clamped state and the unclamped state of the workpiece easily.

Furthermore, since the clamping force generation lamp 123 is turned on when it is determined to be in the clamping force generation state, the user can easily know that a predetermined clamping force is being generated on the workpiece.

In addition, the knuckle joint 62 is made of a metal material, and the first proximity sensor 102a and the second proximity sensor 102b are induction-type proximity sensors. Therefore, as compared with the case where the magnetic detection sensor is used, the sensitivity to the DC magnetic field generated in welding is low. Accordingly, even if the clamp device 10 is used in a welding environment, the first proximity sensor 102a and the second proximity sensor 102b can be operated more stably.

Further, according to the present embodiment, a cylinder tube 22 and a piston 26 reciprocating in the cylinder tube 22 along the axial direction under the action of fluid pressure are further provided. The driving member is the piston rod 30 connected to the piston 26, and the object to be detected is a knuckle joint 62 which mutually connects the piston rod 30 to the link mechanism 16. Therefore, it is unnecessary to attach a separate part as the object to be detected, and the number of parts and the number of operation steps can be reduced.

Further, the first proximity sensor 102a and the second proximity sensor 102b are disposed in the clamp body 14 including a metal material. Therefore, compared with the case where the first proximity sensor 102a and the second proximity sensor 102b are disposed outside the clamp body 14, the clamp device 10 can be downsized. In addition, since the clamp body 14 functions as a magnetic shield, it is less likely to be affected by the DC magnetic field generated in welding.

In the clamp device 10 of the present embodiment, the driving mechanism 12 is not limited to but constituted by a fluid pressure cylinder. The driving mechanism 12 may be constituted by, for example, an electric motor or the like.

The clamp device according to the present invention is not limited to the above-described embodiment, but it is a matter of course that various configurations can be adopted without departing from the gist of the present invention.

The invention claimed is:

1. A clamping device for clamping a workpiece, comprising:
a clamp body;
a driving unit linearly movable in a predetermined direction in the clamp body;
a link mechanism configured to convert the linear motion of the driving unit into a rotational operation of a clamp arm,
a detection unit configured to detect a rotation state of the clamp arm to a clamp state, and
a controller configured to determine the clamp state based on an output from the detection unit, wherein
the detection unit comprises: an object to be detected displaceable in the predetermined direction to and from the clamp state in accordance with the linear motion of the driving unit; and
a first proximity sensor configured to detect a position of the object to be detected, and
the object to be detected includes a first inclined surface at a portion facing the first proximity sensor, the first inclined surface inclining from the predetermined direction such that a sensed distance from the first proximity sensor to the first inclined surface in a direction orthogonal to the predetermined direction changes as the driving unit moves linearly in the predetermined direction, wherein the first proximity sensor is located relative to the object such that the first proximity sensor is able to detect a position of the first inclined surface when the clamp arm is in a clamp state,
the controller being further configured to receive an output signal from the first proximity sensor and determines the clamp state based on a comparison between the output signal from the first proximity sensor and a predetermined clamp threshold value, and determines a clamping force generation state based on a comparison between the output signal from the first proximity sensor and a predetermined clamping force generation threshold value.

2. The clamp device according to claim 1, wherein the detection unit comprises a second proximity sensor disposed apart from the first proximity sensor along the predetermined direction,
the object to be detected is provided with a second inclined surface at a position facing the second proximity sensor, the second inclined surface inclining toward the predetermined direction, and
the controller being further configured to determine an unclamp state based on a comparison between an output signal of the second proximity sensor and a predetermined unclamp threshold value.

3. The clamp device according to claim 2, further comprising:
wherein the controller is further configured to set the clamp threshold value based on the output signal of the first proximity sensor during a first operation and to set the unclamp threshold value based on the output signal of the second proximity sensor during a second operation.

4. The clamp device according to claim 3, wherein the controller is further configured to set the clamping force generation threshold value based on the output signal from the first proximity sensor during a third operation.

5. The clamp device according to claim 2, further comprising:
a clamp lamp disposed visibly from outside and configured to be turned on when the controller determines the clamp state, and
an unclamp lamp disposed visibly from the outside and configured to be turned on when the controller determines the unclamp state.

6. The clamp device according to claim 2, further comprising:
a clamping force generation lamp disposed visibly from outside and configured to be turned on when the determination unit determines the clamping force generation state.

7. The clamp device according to claim 2, wherein the controller is further configured to:
calculate a rotational speed of the clamp arm based on the output signal from the first proximity sensor and the second proximity sensor, and
determine whether the rotational speed calculated by the speed calculating unit is equal to or less than a predetermined speed threshold value.

8. The clamp device according to claim 7, further comprising:
a speed lamp disposed visibly from outside and configured to be turned on when the controller determines that the rotational speed exceeds the speed threshold value.

9. The clamp device according to claim 2, wherein the object to be detected is made of a metal material, and
the first proximity sensor and the second proximity sensor are induction-type proximity sensors.

10. The clamp device according to claim 2, further comprising:
a cylinder tube; and
a piston configured to reciprocate in the cylinder tube along an axial direction under an action of fluid pressure,
wherein the driving unit comprises a piston rod connected to the piston, and
the object to be detected comprises a knuckle joint connecting the piston rod to the link mechanism.

11. The clamp device according to claim 2, wherein the first proximity sensor and the second proximity sensor are arranged inside the clamp body, wherein the clamp body includes a metal material.

* * * * *

UNITED STATES PATENT AND TRADEMARK OFFICE
CERTIFICATE OF CORRECTION

PATENT NO. : 10,744,621 B2
APPLICATION NO. : 15/554939
DATED : August 18, 2020
INVENTOR(S) : Chiaki Fukui et al.

Page 1 of 1

It is certified that error appears in the above-identified patent and that said Letters Patent is hereby corrected as shown below:

In the Claims

In Column 14, Line 23, Claim 6, delete "determination unit" and insert -- controller --, therefor.

Signed and Sealed this
Twenty-second Day of December, 2020

Andrei Iancu
*Director of the United States Patent and Trademark Office*